Feb. 28, 1928.
C. S. ASH
1,660,319
WIRE SPOKE AND THE LIKE
Filed May 10, 1923
2 Sheets-Sheet 2
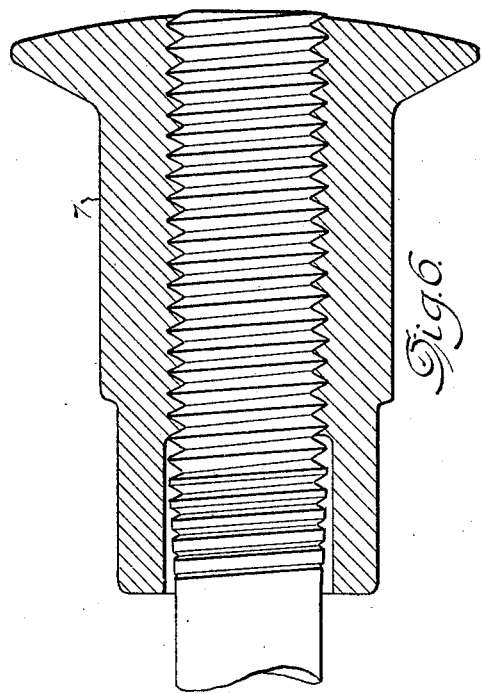
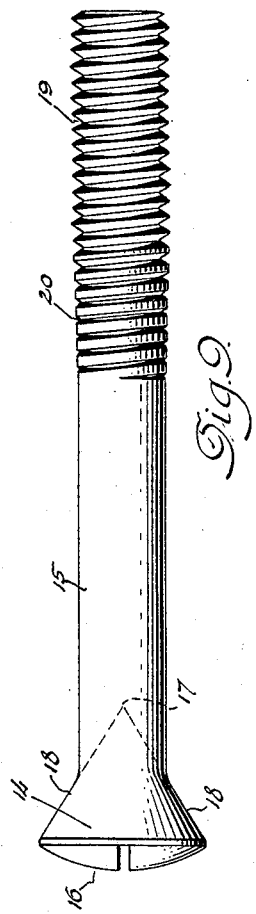
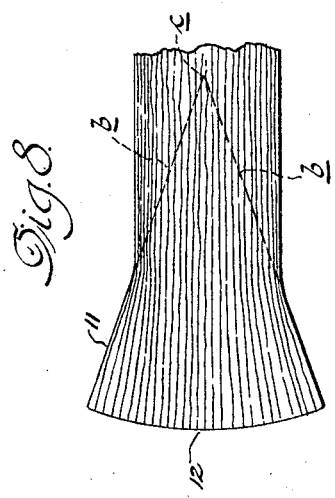
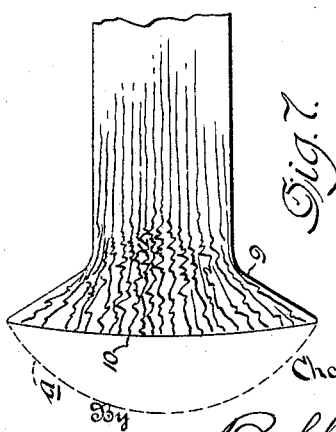
Inventor
Charles S. Ash
Attorney Patented Feb. 28, 1928.

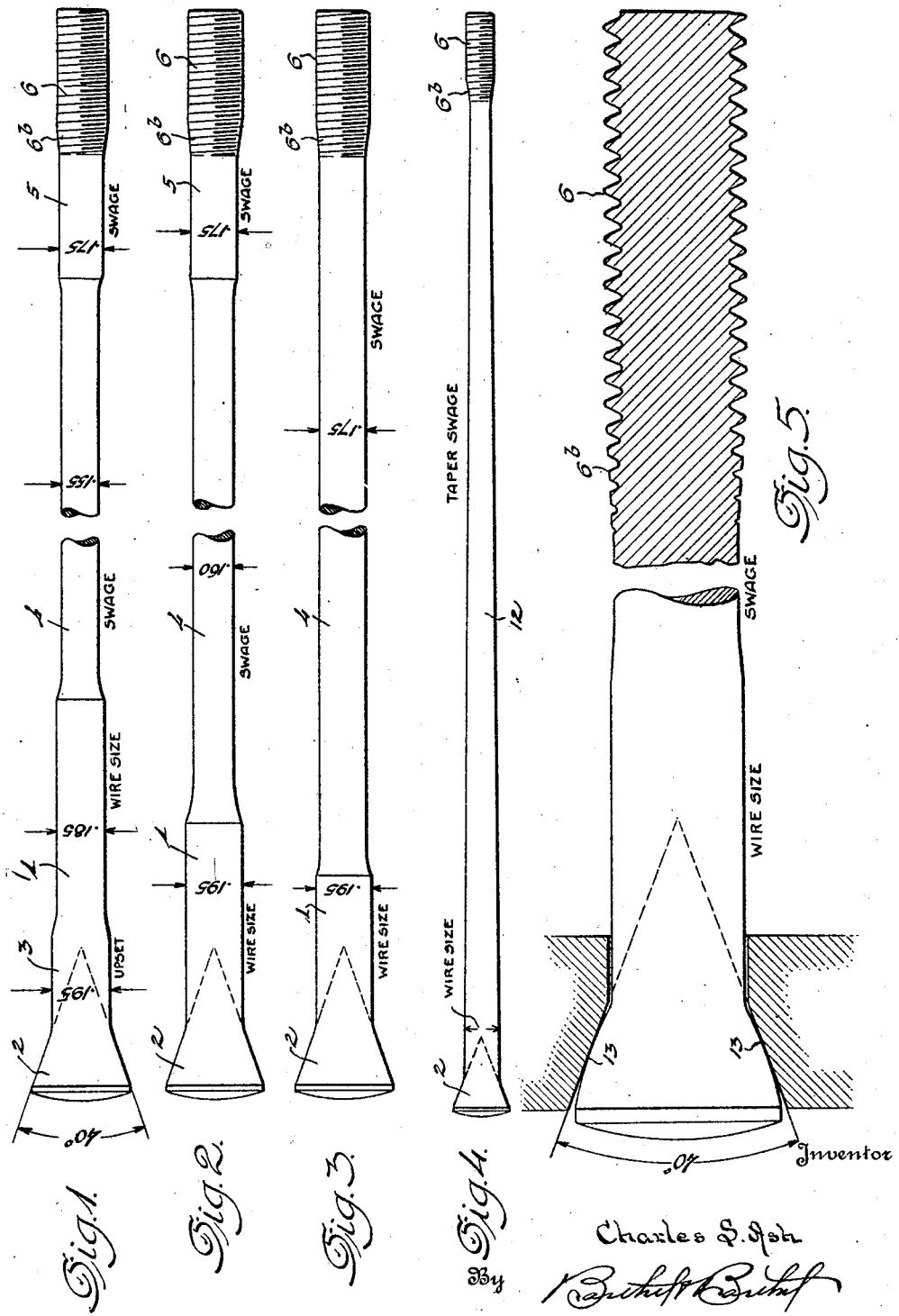

UNITED STATES PATENT OFFICE.

CHARLES S. ASH, OF ROYAL OAK, MICHIGAN.

WIRE SPOKE AND THE LIKE.

Application filed May 10, 1923. Serial No. 637,947.

This invention relates to the production of wire wheel spokes for use in what are known as wire wheels for vehicles and more particularly, automobile wheels comprising a hub and rim with wire spokes interlaced between and connecting the hub and rim.

Such spokes are usually formed from wire with a head at one end thereof formed by upsetting the end of the wire and are screw-threaded at their opposite end to receive a suitable nut by means of which the spoke is secured to the wheel rim and put under tension, the head being engaged with the wheel hub and seated in a seat therein. It has been found that such spokes usually break, either adjacent the head or inner end of the screw-thread, due to the weakened condition of the metal at those points and to the comparative rigidity of the intermediate body portion of the spoke which because of its rigidity transmits the bending strains to the weakest parts adjacent the head and threaded end.

An object of the present invention is to give to the spoke head such a configuration that the part will not be weakened by the operation of upsetting the head, and to so form the threaded end that the spoke will not be materially weakened at the inner termination of the thread. A further object is to so form the spoke as to distribute the strains throughout the length thereof, adding strength and rigidity at those points where breakage is liable to occur and making the intermediate body portion of greater flexibility than is usually provided, to take and distribute the bending strains. It is also an object to provide a spoke which may be produced by the usual manufacturing methods with a configuration which will give the maximum strength and which will have certain other new and useful features, all as hereinafter more fully described.

With the above and other ends in view, the invention consists in the matters hereinafter set forth and more particularly pointed out in the appended claims, reference being had to the accompanying drawings in which Figure 1 is a side elevation of a spoke illustrative of the invention;

Figs. 2, 3 and 4 are similar views showing slightly modified constructions;

Fig. 5 is an enlarged view showing a further modified construction;

Fig. 6 is an enlarged longitudinal sectional view of a screw-threaded end portion of a spoke and a nut or nipple applied thereto;

Fig. 7 is a detail of a spoke head showing an old construction and illustrating the condition of the metal after the upsetting of the head;

Fig. 8 is a detail of a spoke head illustrative of the present invention and illustrating the condition of the metal after the head upsetting operation, and Fig. 9 is a side elevation of a cap screw embodying features of the invention.

In the forming of wire spokes embodying the present invention, a drawn steel wire of suitable diameter and length is provided, and as shown in Fig. 1; this wire 1 is upset at one end to form a head 2 thereon and a shank portion 3 adjacent the head of slightly greater diameter than the diameter of the wire 1. By means of suitable swaging dies (not shown) the wire is swaged down to a diameter smaller than its original diameter, from a point a short distance from the inner end of the upset and enlarged shank portion 3, throughout the length of the main or body portion 4 of the spoke to a short distance from the opposite end thereof, the swaging dies being released slightly at this point to increase the diameter of this end portion of the spoke, and then this swaged end portion 5 is screw-threaded, as at 6 to receive a suitable nut or nipple 7 shown in Fig. 6.

In upsetting the end of the wire to form the head 2, the metal adjacent the head is simultaneously upset endwise to increase the diameter of the shank portion 3 and give added strength to this portion which joins the head to the wire portion 1, without swaging the wire and thus making the metal hard and more brittle. By leaving a portion 1 of the spoke adjacent the shank, of the original wire size, this end portion which connects the main or body portion 4 to the shank retains the full strength or toughness and rigidity of the original wire to take the severe torsional or bending strains to which the inner or hub-end portions of the spokes are subjected in the assembled wheel, and by swaging the means or middle portion 4 of the spoke, which portion is comparatively long, the stretch is taken out of the spoke to prevent its becoming loose under severe strains in use and is also made resilient so that it will bend slightly in use, and, being of considerable length, will distribute such bending action over a major portion of the length of the spoke instead of localizing such action. By swaging the outer end portion 5 to a less degree than the main part 4 of the spoke, the portion at the inner end of the screw-thread is strengthened sufficiently in proportion to the other parts to obviate breakage and is made less flexible than the main portion to prevent bending and consequent breakage at this point, this end portion being swaged sufficiently however, to take out the stretch. The spoke is therefore, in effect, a tapered spoke, being of greatest diameter and strength at its head end and reduced in steps from said end.

To further guard against breakage of the spoke at the inner end of the thread, said thread 6 is formed of gradually decreasing depth from intermediate the ends of the threaded section inwardly, running out at the inner end near the inner end of the end portion 5 of the spoke, said thread being preferably a rolled thread, and thus the spoke is not weakened by the thread beyond the inner end of the nut or nipple 7 when the same is in place thereon. Liability of breakage due to cutting away or displacement of the metal by the formation of the thread on the spoke end, is therefore obviated.

In Fig. 7 of the drawings is illustrated a spoke head 9 as commonly formed, and what happens to the metal fibres in the operation of upsetting a head of this form, is illustrated by lines drawn upon the figure showing that by reason of the comparatively flat form of the upper end face 10 of the head, the longitudinal fibres of the metal are distorted or crushed endwise instead of, as in applicant's construction illustrated in Fig. 8, being spread and moved bodily endwise. In the old construction, the upsetting pressure upon the end of the wire simply crumples, crushes and compresses the fibres because the crown 10 or upper surface of the head is substantially flat and the metal fibres adjacent the longitudinal axis of the wire are shortened in the forming operation while the outer fibres are spread laterally to give the increased head-diameter. Because of this breaking down of the metal fibres where the head joins the shank, the spoke is weakened at this point and it is found that this is where it usually breaks. To prevent such disintegration of the fibres, a head of this common form should have a crown as indicated by the dotted line $a$, but this would not be practical in a spoke construction as the crown would project too far.

In the present construction the conical or side surface 11 of the head is so formed that if the cone be completed as indicated in dotted lines at $b$, its apex would be located at a point in the longitudinal axis of the shank wall inwardly from the meeting of the shank and head as indicated at $c$, and by forming the end surface or crown 12 of the head concentric with this apex of point $c$ where the planes of the surfaces 11 meet, the metal fibres of the head and shank adjacent the longitudinal axis thereof will be of substantially the same length as the surrounding fibres, and will not be crushed or disintegrated in the forming operation, and that part of the spoke where the shank joins the head will be as strong as any other part. Further, by giving the head a greater degree of taper, less crown is necessary and the fibres are spread laterally to form the head without bending at an abrupt angle where the head joins the shank and the head is provided with an extended seating surface.

In other words, in the common form, the metal is crushed and compressed in forming the head, thus greatly decreasing its tensile strength, while the present form is given such configuration that the metal is permitted to flow and spread without disrupting its fibrous construction, the crown providing a space in the dies for the metal so that the center fibres will not be crushed or moved endwise relative to the surrounding fibres, and the fibrous structure of the metal is retained.

Swaging of wire makes it hard and brittle, but more resilient and flexible, at the same time taking out the stretch or elongation under heavy strains. Wire spokes formed from un-swaged wire, therefore, elongate under the heavy strains to which they are subjected in use and it is therefore desirable to swage them, at least, throughout a major portion of their length in order to eliminate their tendency to stretch and become loose in the wheel. Swaging, as above pointed out makes the wire more or less brittle and increases its resiliency and flexibility, and therefore it is desirable that that portion of the spoke which is subjected to severe bending strains, be made strong and rigid, while the major portion or body of the spoke be swaged to increase its flexibility and thus distribute the bending action throughout a considerable length of the spoke. Wire spokes for vehicle wheels must, necessarily, be made as light in weight and small in diameter as possible to reduce the weight of the complete wheel and give it a neat and attractive appearance, and also to secure the desired resiliency. Further, as the bending strain upon these spokes is less toward their outer ends than near their inner ends, their outer end portions may be reduced in diameter without materially weakening the spokes. It is therefore highly desirable to provide a spoke of decreasing diameter from its head and outwardly, and such construction is shown in the accompanying drawings, such reduction being secured through a step formation as shown in Figs. 1 to 3 inclusive and by a gradual tapering of the main swaged portion 12 of the spoke, as shown in Fig. 4. In order to give added strength and rigidity to the extreme outer or threaded end portion 5 of the spoke, said portion may be reduced in diameter to a less extent than the main portion 4 by the swaging operation, as shown in Figs. 1 and 2, if found desirable, but such formation will usually be found unnecessary where the thread is gradually tapered out as illustrated at 6 in Fig. 5, as such tapering out of the thread beyond the end of the nut or nipple 7 prevents the breaking of the spoke at this point due to the distribution of the bending strains over a considerable length of the spoke instead of localizing such strains.

As previously pointed out, when the head is given the preferred extended taper, said head has an increased seating area within its seat in the hub of the wheel and such seating will prevent movement of the head within its seat. In certain wheel constructions this may be found of advantage, but in those constructions where movement of the head in its seat is desirable, this conical surface may be curved slightly longitudinally of the head, as shown at 13 in Fig. 5.

Obviously the form of head whereby the breaking down of the metal fibres in the upsetting operation is prevented, may be applied to articles other than wire spokes, as may also the idea of tapering or running out of the thread whereby the bending strain which would otherwise be localized within the last turn of the thread is distributed over a considerable length of the body inward from the last turn of full depth, and as an illustration of such application, a cap screw is shown in Fig. 9 wherein a conical head 14 is formed upon a body 15 by an upsetting operation with the crown 16 of the head formed concentric with the point 17 of intersection of the planes of the conical side surfaces 18 of the head, for the purpose hereinbefore described. At its opposite end the body is formed with a screw-thread 19 with the inner turns of this thread tapered as at 20 or formed of gradually decreasing depth until they finally run out upon the surface of the body. In a cap screw or other device employing a screw-threaded end and which is subjected to bending strains, the breaking of the body within the inner turn is prevented by the distribution of these bending strains by the tapering out of the thread.

Other modifications and applications of the present invention are contemplated within the scope of the appended claims which are therefore to be construed broadly and not as limited to the particular construction shown.

What I claim is:—

1. A wire spoke including a body with an upset truncated conical head having a crowned end surface formed concentric with the apex of the completed cone.

2. A wire spoke including a body having a rolled thread at one end, the root of which thread is gradually increased in diameter, tapering outwardly to the full diameter of the body.

3. A wire spoke including a body having an upset truncated conical head at one end, said head having a crowned end surface formed concentric with the apex of the completed cone, and the opposite end of said body being formed with a rolled thread the root diameter of which thread is gradully increased, tapering outwardly to the full diameter of the body.

In testimony whereof I affix my signature.

CHARLES S. ASH.